US011807380B2

United States Patent
Wise et al.

(10) Patent No.: US 11,807,380 B2
(45) Date of Patent: Nov. 7, 2023

(54) TAIL CONE MOUNTED GENERATOR INPUT SHAFT FOR AN AIRCRAFT

(71) Applicant: Hamilton Sundstrand Corporation, Charlotte, NC (US)

(72) Inventors: Thomas John Wise, Rockford, IL (US); Glenn C. Lemmers, Jr., Loves Park, IL (US); Mark J. Franklin, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 337 days.

(21) Appl. No.: 17/172,207

(22) Filed: Feb. 10, 2021

(65) Prior Publication Data

US 2022/0250760 A1 Aug. 11, 2022

(51) Int. Cl.
*B64D 33/08* (2006.01)
*B64D 33/02* (2006.01)
*B64D 33/04* (2006.01)

(52) U.S. Cl.
CPC .............. *B64D 33/08* (2013.01); *B64D 33/02* (2013.01); *B64D 33/04* (2013.01); *B64D 2033/024* (2013.01); *B64D 2033/0273* (2013.01)

(58) Field of Classification Search
CPC .............. B64D 33/02; B64D 2033/024; B64D 2033/0273; B64D 33/04; B64D 33/08
USPC ........................................................ 244/60
See application file for complete search history.

(56) References Cited

U.S. PATENT DOCUMENTS

| 3,126,080 | A | 3/1964 | Travis et al. |
| 5,418,412 | A | 5/1995 | Brucker |
| 8,456,051 | B2 | 6/2013 | Raad |
| 9,917,490 | B2 | 3/2018 | Lemmers et al. |
| 2013/0014513 | A1 | 1/2013 | Barnett et al. |
| 2016/0149469 | A1 | 5/2016 | Lemmers et al. |
| 2017/0307063 | A1* | 10/2017 | Gravina ................ F16H 57/082 |
| 2020/0291810 | A1 | 9/2020 | Spierling |

OTHER PUBLICATIONS

Extended European Search Report for European Application No. 22156053.5; dated Jul. 5, 2022 (pp. 1-8).

\* cited by examiner

*Primary Examiner* — Brady W Frazier
(74) *Attorney, Agent, or Firm* — CANTOR COLBURN LLP

(57) ABSTRACT

A jet engine includes a housing, an intake portion leading into the housing, and an exhaust portion leading from the housing. The exhaust portion includes an exhaust duct and a tail cone arranged radially inwardly of the exhaust duct. An engine portion is arranged in the housing between the intake portion and the exhaust portion. A generator is arranged in the tail cone and is operatively connected to the engine portion. A drive shaft extends from the engine portion to the generator. The drive shaft includes a first end coupled to the engine portion, a second end connected to the generator, and an intermediate portion extending therebetween. The intermediate portion includes a cooling passage that extends from the second end toward a terminal end that terminates short of the first end of the drive shaft.

15 Claims, 4 Drawing Sheets

TAIL CONE MOUNTED GENERATOR INPUT SHAFT FOR AN AIRCRAFT

BACKGROUND

Exemplary embodiments pertain to the art of jet powered aircraft and, more particularly, to an aircraft having a generator mounted in a tail cone of a jet engine.

Jet engines are often used to provide motive power to a vehicle. The engines may be mounted in a nacelle or in a body of the vehicle itself. The jet engine typically includes a high-pressure spool having a high-pressure spool engine shaft and a low-pressure spool having a low-pressure engine shaft. The jet engine also includes an intake, and exhaust supporting a nozzle and a tail cone. The tail cone helps channel exhaust gases through the nozzle to improve thrust performance.

Often times, in addition to providing power to the vehicle, the jet engine also provides power to a generator. The generator provides power to various electrical systems in the vehicle. Generally, the high-pressure shaft includes a power take off that is connected to a gear box. The gear box is then connected to the generators located in the body of the vehicle. Locating a gear box and generator on some vehicles presents challenges. There is a need to avoid creating bulges or other protuberances that might detract from and overall aerodynamic efficiency of the body. Accordingly, the industry would welcome new solutions for mounting a generator in a vehicle without creating additional surface deviations.

BRIEF DESCRIPTION

Disclosed is a jet engine including a housing, an intake portion leading into the housing, and an exhaust portion leading from the housing. The exhaust portion includes an exhaust duct and a tail cone arranged radially inwardly of the exhaust duct. An engine portion is arranged in the housing between the intake portion and the exhaust portion. A generator is arranged in the tail cone and is operatively connected to the engine portion. A drive shaft extends from the engine portion to the generator. The drive shaft includes a first end coupled to the engine portion, a second end connected to the generator, and an intermediate portion extending therebetween. The intermediate portion includes a cooling passage that extends from the second end toward a terminal end that terminates short of the first end of the drive shaft.

Additionally, or alternatively, in this or other embodiments, the cooling passage includes an inlet at the second end, the inlet being fluidically connected to the generator.

Additionally, or alternatively, in this or other embodiments, the cooling passage includes an outlet arranged between the first end and the second end.

Additionally, or alternatively, in this or other embodiments, the outlet includes a plurality of openings that extend radially outwardly from the cooling passage through the drive shaft.

Additionally, or alternatively, in this or other embodiments, the drive shaft includes a glide ring groove that is receptive of a glide ring, the glide ring groove being spaced from the second end and providing a sliding interface with the generator.

Additionally, or alternatively, in this or other embodiments, the glide ring groove includes a first radially outwardly extending projection and a second radially outwardly extending projection, the glide ring groove being defined between the first radially outwardly extending projection and the second radially outwardly extending projection.

Additionally, or alternatively, in this or other embodiments, the first end of the drive shaft includes an engine portion interface and the second end of the drive shaft includes a generator interface.

Additionally, or alternatively, in this or other embodiments, the generator interface comprises a splined interface.

Additionally, or alternatively, in this or other embodiments, the splined interface includes a substantially constant cross-sectional diameter.

Additionally, or alternatively, in this or other embodiments, the engine portion interface comprises a splined interface portion.

Additionally, or alternatively, in this or other embodiments, the splined interface portion includes a tapered cross-section.

Additionally, or alternatively, in this or other embodiments, the drive shaft includes a shear neck operable to fail at a predetermined torque.

Additionally, or alternatively, in this or other embodiments, the shear neck defines a reduced diameter section of the drive shaft.

Additionally, or alternatively, in this or other embodiments, the shear neck is arranged at the first end.

Additionally, or alternatively, in this or other embodiments, the shear neck is arranged between the terminal end and the first end of the drive shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
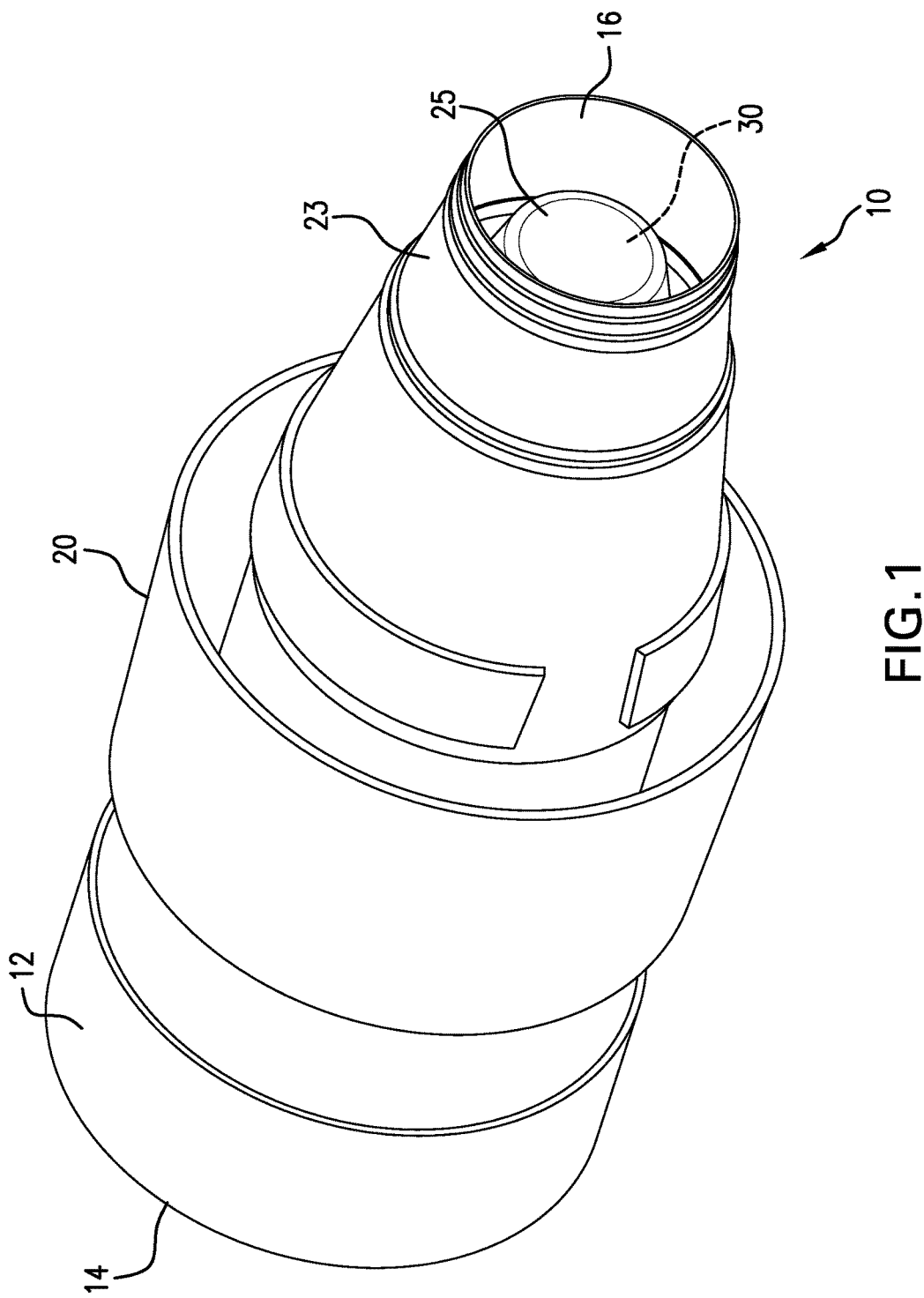
FIG. 1 depicts a jet engine including a tail cone mounted generator, in accordance with an exemplary aspect.
Figure 2:
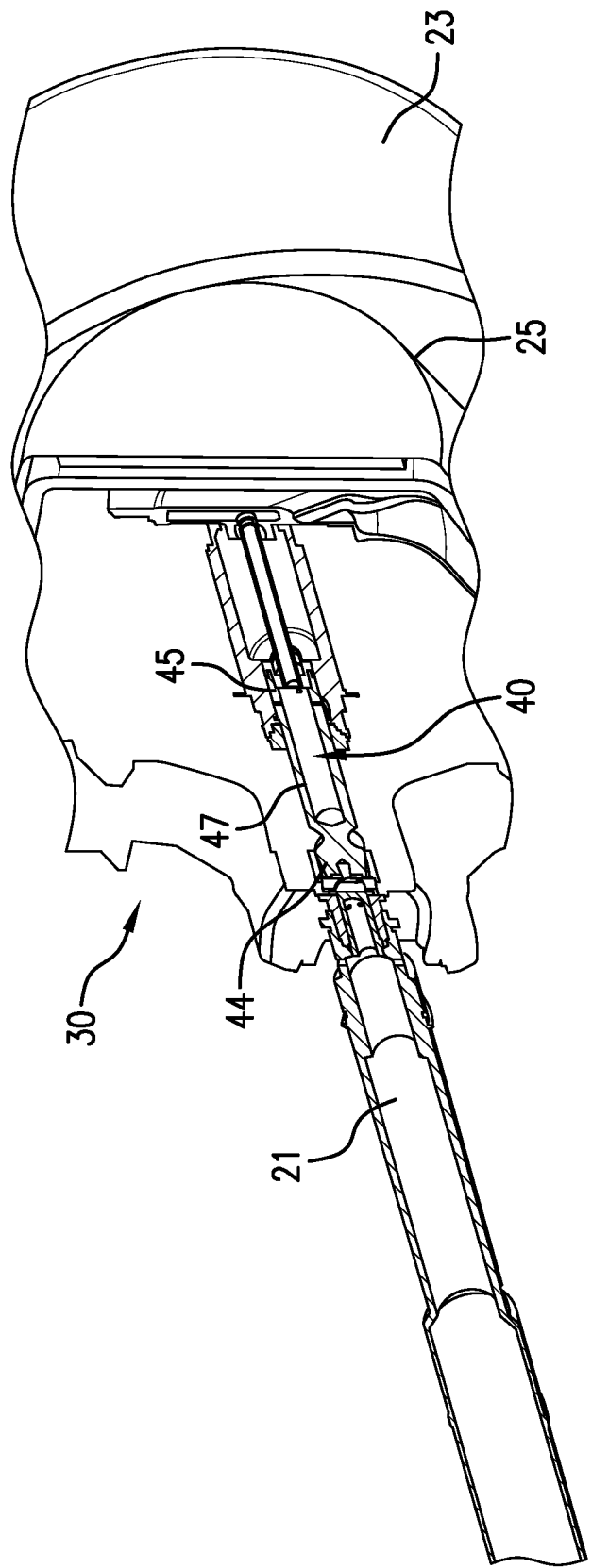
FIG. 2 depicts a partial cross-section view of the generator of FIG. 1 showing a drive shaft connected to the jet engine, in accordance with an exemplary aspect.

A jet engine, in accordance with an exemplary aspect, is indicated generally at 10 in FIG. 1. Jet engine 10 may be mounted in an aircraft and includes a housing 12 having an intake portion 14 and an exhaust portion 16. An engine portion 20 is disposed between intake portion 14 and exhaust portion 16. Engine portion 20 may include a high-pressure spool (not shown) coupled to a low-pressure spool (also not shown) having a low pressure spool shaft 21 as shown in FIG. 2. Exhaust portion 16 includes an exhaust duct 23 that surrounds a tail cone 25. At this point it should be understood that while described in terms as being associated with an aircraft, jet engine 10 may be employed to power various forms of vehicles.

In accordance with an exemplary aspect, jet engine 10 includes a generator 30 arranged in the tail cone and operatively connected to engine portion 20. In an embodiment, a drive shaft 40 extends between low pressure spool shaft 21 and generator 30. Drive shaft 40 includes a first end 44 coupled to low pressure spool shaft 21, a second end 45 coupled to generator 30, and an intermediate portion 47 extending therebetween.

Figure 3:
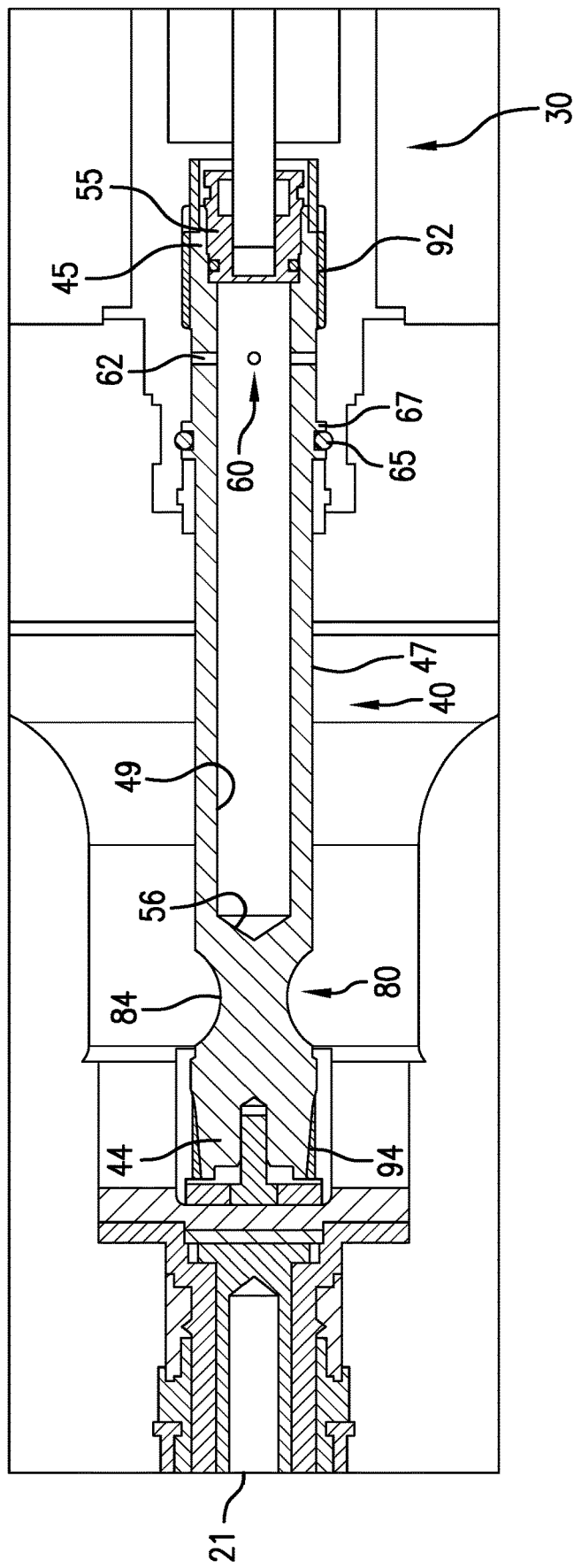
FIG. 3 depicts a plan view of the drive shaft of FIG. 2, in accordance with an exemplary aspect.
Figure 4:
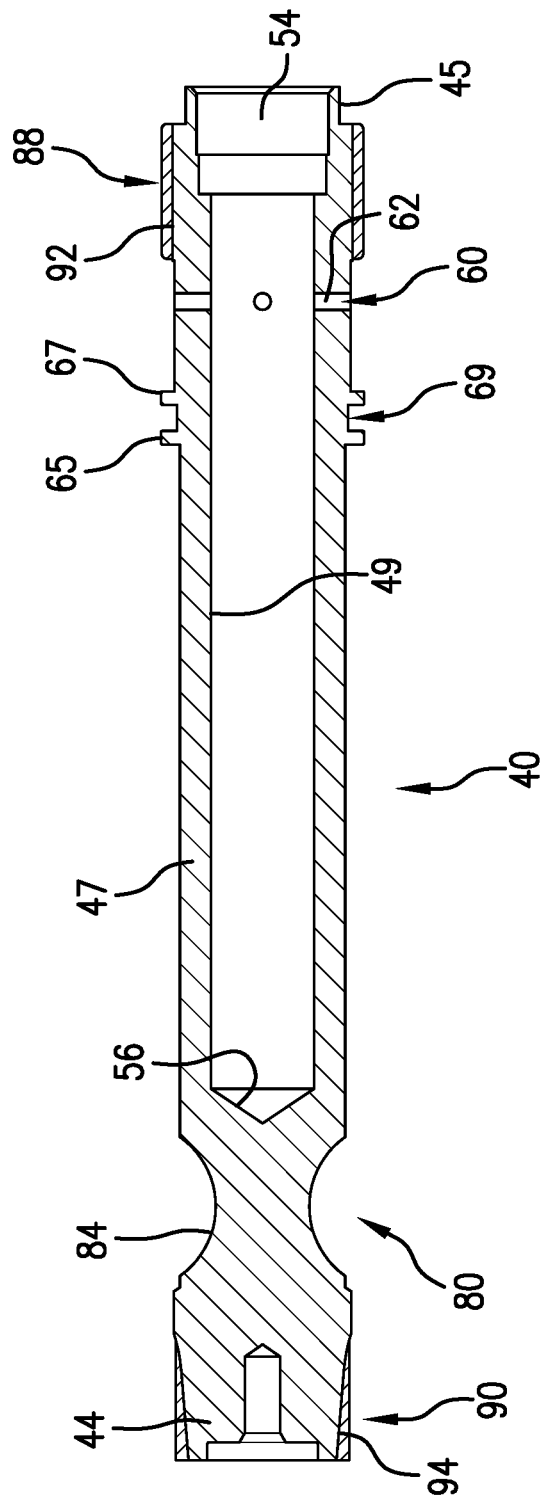
FIG. 4 depicts a cross-sectional view of the drive shaft of FIG. 3, in accordance with an exemplary aspect.

As shown in FIGS. 3 and 4, a cooling passage 49 extends from second end 45 towards first end 44. More specifically, cooling passage 49 includes an inlet 54 that may include a metering orifice plug 55 arranged at second end 45 and a blind terminal end 56 arranged in intermediate portion 47 spaced from first end 44. Cooling passage 49 includes an outlet 60 that may take the form of a plurality of openings 62 which extend radially outwardly through drive shaft 40. Cooling fluid, such as oil (not shown) passes into inlet 54 and flows toward terminal end 56. Forces generated by drive shaft 40 cause the cooling fluid to flow radially outwardly onto internal surfaces (not separately labeled) of cooling passage 49 and, along intermediate portion 47 to eventually pass through outlets 60. The cooling fluid lowers temperatures of drive shaft 40 resulting from contact, either directly or indirectly, with exhaust gases passing from exhaust duct 23.

In further accordance with an exemplary aspect, drive shaft 40 includes a first radially outwardly extending projection 65 and a second radially outwardly extending projection 67 provided in intermediate portion 47. A glide ring groove 69 is defined between the first radially outwardly extending projection 65 and the second radially outwardly extending projection 67. A glide ring (not separately labeled) is arranged in glide ring groove 69. Glide ring groove 69 is designed to accommodate axial shifting of drive shaft 40 relative to generator 30, including thermal expansion of low-pressure spool shaft 21, as well as provide a seal that limits any undesirable escape of lubricant.

In accordance with an exemplary aspect, drive shaft 40 includes a shear neck 80 disposed between terminal end 56 of cooling passage 49 and first end 44. Shear neck 80 defines a zone of reduced cross-sectional area 84 that is designed to fail when exposed to a predetermined torque experienced by drive shaft 40. For example, if generator 30 locks up preventing rotation of drive shaft 40, shear neck 80 will fail once torque exceeds a predetermined level so as to prevent any negative impact on engine portion 20.

In accordance with another exemplary aspect, drive shaft 40 includes a generator interface 88 arranged at second end 45 and an engine portion interface 90 arranged at first end 44. Generator interface 88 takes the form of a splined interface having a plurality of splines (not separately labeled) extending across a portion of second end 45 having a substantially constant cross-sectional diameter. The plurality of splines establish a sliding interface between drive shaft 40 and generator 30. Conversely, engine portion interface 90 includes a splined interface portion including a plurality of splines (not separately labeled) extending across a portion of first end 44 having a varying diameter. That is, engine portion interface 90 takes the form of tapered splines that increase in diameter from first end 44 toward second end 45. The tapered splines accommodate the use of a zero backlash adapter attached to drive shaft 40 and low pressure spool shaft 21.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A jet engine comprising:
    a housing;
    an intake portion leading into the housing;
    an exhaust portion leading from the housing, the exhaust portion including an exhaust duct and a tail cone arranged radially inwardly of the exhaust duct;
    an engine portion arranged in the housing between the intake portion and the exhaust portion;
    a generator arranged in the tail cone and operatively connected to the engine portion; and
    a drive shaft having a one-piece construction extending from the engine portion to the generator, wherein the drive shaft includes a first end coupled to the engine portion, a second end connected to the generator, and an intermediate portion extending therebetween, the intermediate portion including a cooling passage that extends from the second end toward a terminal end that terminates short of the first end of the drive shaft, wherein the cooling passage includes an outlet arranged between the first end and the second end, the outlet being defined by a plurality of openings that extend radially outwardly from the cooling passage through the drive shaft.

2. The jet engine according to claim 1, wherein the cooling passage includes an inlet at the second end, the inlet being fluidically connected to the generator.

3. The jet engine according to claim 1, wherein the drive shaft includes a glide ring groove that is receptive of a glide ring, the glide ring groove being spaced from the second end and providing a sliding interface with the generator.

4. The jet engine according to claim 3, wherein the glide ring groove includes a first radially outwardly extending projection and a second radially outwardly extending projection, the glide ring groove being defined between the first radially outwardly extending projection and the second radially outwardly extending projection.

5. The jet engine according to claim 1, wherein the first end of the drive shaft includes an engine portion interface and the second end of the drive shaft includes a generator interface.

6. The jet engine according to claim 5, wherein the generator interface comprises a splined interface.

7. The jet engine according to claim 6, wherein the splined interface includes a substantially constant cross-sectional diameter.

8. The jet engine according to claim 5, wherein the engine portion interface comprises a splined interface portion.

9. The jet engine according to claim 8, wherein the splined interface portion includes a tapered cross-section.

10. The jet engine according to claim 1, wherein the drive shaft includes a shear neck operable to fail at a predetermined torque.

11. The jet engine according to claim 10, wherein the shear neck defines a reduced diameter section of the drive shaft.

12. The jet engine according to claim 10, wherein the shear neck is arranged at the first end.

13. The jet engine according to claim 12, wherein the shear neck is arranged between the terminal end and the first end of the drive shaft.

14. The jet engine according to claim 1, wherein the outlet is closer to the second end than to the first end.

15. The jet engine according to claim 14, wherein the outlet is fluidically connected to the generator.

\* \* \* \* \*